United States Patent
Matsumoto et al.

(10) Patent No.: US 7,722,372 B2
(45) Date of Patent: May 25, 2010

(54) DIRECT MOUNTING CONNECTOR

(75) Inventors: Mitsuhiro Matsumoto, Shizuoka (JP); Hirotaka Fukushima, Shizuoka (JP); Takashi Tsukamoto, Shizuoka (JP); Kenjiro Shiba, Aichi (JP); Tomoyuki Watanabe, Aichi (JP); Takashi Okamoto, Aichi (JP)

(73) Assignees: Yazaki Corporation, Tokyo (JP); Toyota Jidosha Kabushiki Kaisha, Toyota-shi (JP); Kabushiki Kaisha Toyota Jidoshokki, Kariya-shi (JP)

( * ) Notice: Subject to any disclaimer, the term of this patent is extended or adjusted under 35 U.S.C. 154(b) by 400 days.

(21) Appl. No.: 11/662,501

(22) PCT Filed: Sep. 12, 2005

(86) PCT No.: PCT/JP2005/016747

§ 371 (c)(1),
(2), (4) Date: Mar. 12, 2007

(87) PCT Pub. No.: WO2006/030732

PCT Pub. Date: Mar. 23, 2006

(65) Prior Publication Data

US 2009/0023345 A1    Jan. 22, 2009

(30) Foreign Application Priority Data

Sep. 13, 2004    (JP)    ............... 2004-265538

(51) Int. Cl.
    *H01R 4/60*    (2006.01)
(52) U.S. Cl. ............... 439/213; 439/76.2; 174/68.2
(58) Field of Classification Search ............... 439/213, 439/736, 21, 76.2; 361/624, 637, 638; 174/68.2, 174/70 B, 99 B, 133 B, 149 B
See application file for complete search history.

(56) References Cited

U.S. PATENT DOCUMENTS

| | | | |
|---|---|---|---|
| 6,056,592 A | | 5/2000 | Hashizawa et al. |
| 6,325,640 B1 * | | 12/2001 | Kasai ............... 439/76.2 |
| 6,461,172 B2 * | | 10/2002 | Ross ............... 439/78 |
| 6,629,854 B2 * | | 10/2003 | Murakami ............... 439/251 |
| 6,737,773 B2 * | | 5/2004 | Hayashi et al. ............... 310/71 |
| 7,268,300 B2 * | | 9/2007 | Miyazaki ............... 174/138 F |
| 2005/0090132 A1 | | 4/2005 | Miyazaki |

FOREIGN PATENT DOCUMENTS

| | | |
|---|---|---|
| JP | 8-126182 | 5/1996 |
| JP | 11-126661 | 5/1999 |
| JP | 2005-93166 | 4/2005 |

* cited by examiner

Primary Examiner—Xuong M Chung-Trans
(74) Attorney, Agent, or Firm—Kratz, Quintos & Hanson, LLP (57) ABSTRACT

A direct mounting connector includes: six independent busbars for connecting the apparatus to two auxiliary machines for three-phase alternating current; two U-pole first terminal parts, two V-pole first terminal parts and two W-pole first terminal parts The six first terminal parts are connected to the apparatus at first ends of the respective six busbars, the two first terminal parts of the same pole are arranged adjacently to each other; and two sets, each set of which consists of a second U-pole terminal part, a second V-pole terminal part and a second W-pole terminal part The six second terminal parts are connected to the two auxiliary machines at second ends of the respective six busbars, the two sets arranged adjacently to each other having a distance therebetween. Busbar parts extend between the two sets of the second terminal parts.

7 Claims, 9 Drawing Sheets

PRIOR ART

FIG. 11

PRIOR ART

FIG. 12

PRIOR ART

FIG. 13

PRIOR ART

FIG. 14

PRIOR ART

DIRECT MOUNTING CONNECTOR

TECHNICAL FIELD

The present invention relates to a direct mounting connector to be directly mounted on an apparatus including busbars for connecting two three-phase alternating current motors (auxiliary machines) to an inverter (apparatus) in an electric vehicle, for example.

BACKGROUND ART

Figure 11:
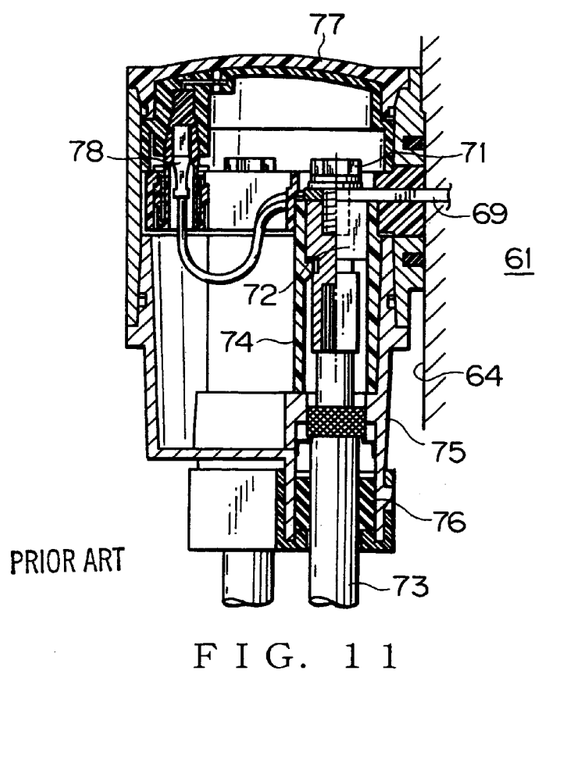
FIG. 11 is a longitudinal cross sectional view illustrating an example of a conventional direct mounting connector.
Figure 12:
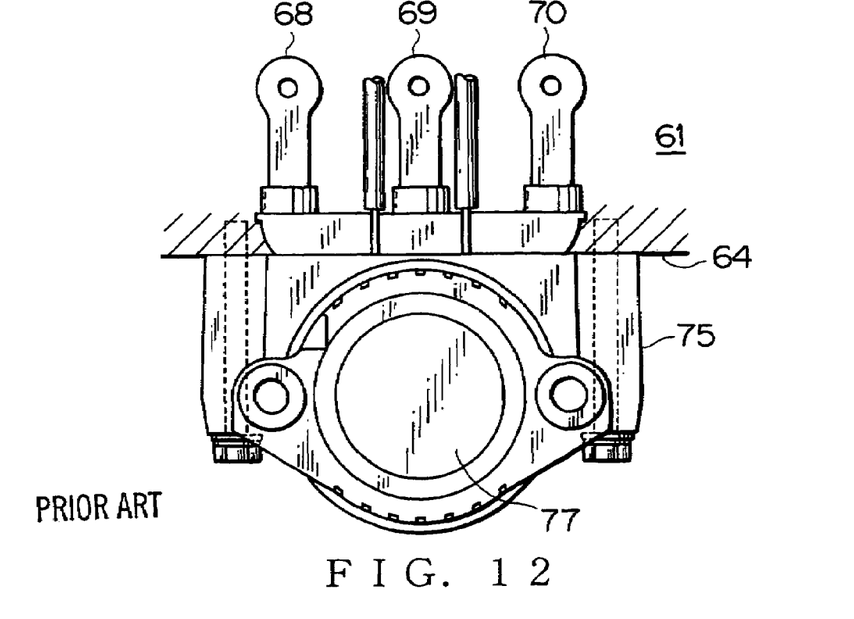
FIG. 12 is a plan view illustrating an example of a conventional direct mounting connector.

FIGS. 11 and 12 show an example of a conventional direct mounting connector (for example, see Patent Publication 1).

A direct mounting connector 61 is provided on a case (64) of an inverter (apparatus) 64 to which three-phase alternating current motors 62, 63 (see FIG. 13) for an electric vehicle are connected. The direct mounting connector 61 includes: three busbar terminals 68-70 corresponding to triple-pole circuits 65-67 (see FIG. 14) of UVW of the apparatus side; electric wires 73 each having a terminal for connecting each of busbar terminals 68-70 by a bolt 71; housings 74 each made of electrically insulating resin for receiving each terminal 72; and a shield shell 75 made of electrically conductive metal for covering the outside of the housings 74.

The triple-pole circuits 65-67 (FIG. 14) within the apparatus are connected to the respective busbar terminals 68-70 by means of bolting. The electric wire 73 having the terminal is sealed with a waterproof plug 76 and the upper part of the housing 74 is sealed a cap 77 of the shield shell. The upper part of the housing 74 is provided with a terminal 78 of a safety circuit which cuts a power source when the cap 77 is opened. The shield shell 75 is fixed on a wall made of electrically conductive metal of the apparatus 64 by a bolt.

Figure 13:
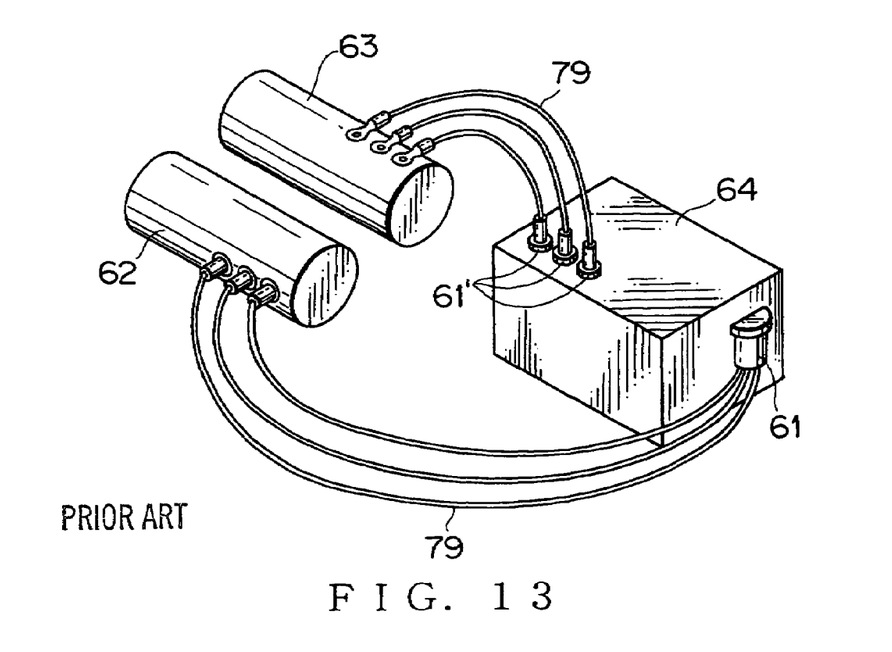
FIG. 13 is a perspective view illustrating an example of a conventional connecting structure of a motor (auxiliary machine) and an inverter (apparatus).

FIG. 13 shows a connecting structure of the direct mounting connector 61 and the three-phase alternating current motors 62, 63 for an electric vehicle, wherein the two motors (for example, a motor for driving a right wheel and a motor for driving a left wheel) 62, 63 are electrically connected to the apparatus (an inverter, i.e. direct current-alternating current converter) 64 through three electric wires 79.

Figure 14:
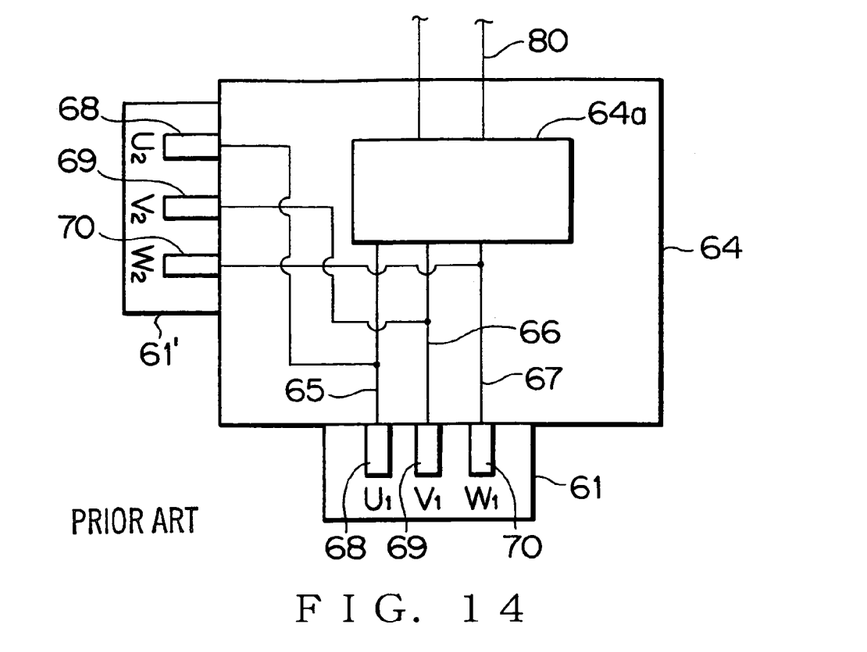
FIG. 14 is a view illustrating an example of a conventional circuit connecting state of an inverter (apparatus) and a direct mounting connector.

In the example shown in the figures, one motor 62 is connected to the apparatus 64 through the direct mounting connector 61 shown in FIG. 11, while the other motor 63 is connected to the apparatus 64 through respective small connectors 61' per respective electric wires. Each direct mounting connector 61, 61' is provided on a different wall of a case of the apparatus. Both motors 62, 63 may be connected to the apparatus 64 through the two direct mounting connectors 61 shown in FIG. 11. The apparatus 64 is connected to a direct current battery (not shown in the figure) by two electric wires 80. In FIG. 14, a reference numeral 64a denotes a main body of the apparatus.

A direct current from the battery is converted to an alternating current by the apparatus (inverter) 64 so as to drive the respective motors 62, 63. Each motor acts as a generator by regeneration braking action thereof. An alternating current generated in each motor 62, 63 is converted to a direct current by the apparatus 64 and the battery is charged with the converted direct current.

Figure 15:
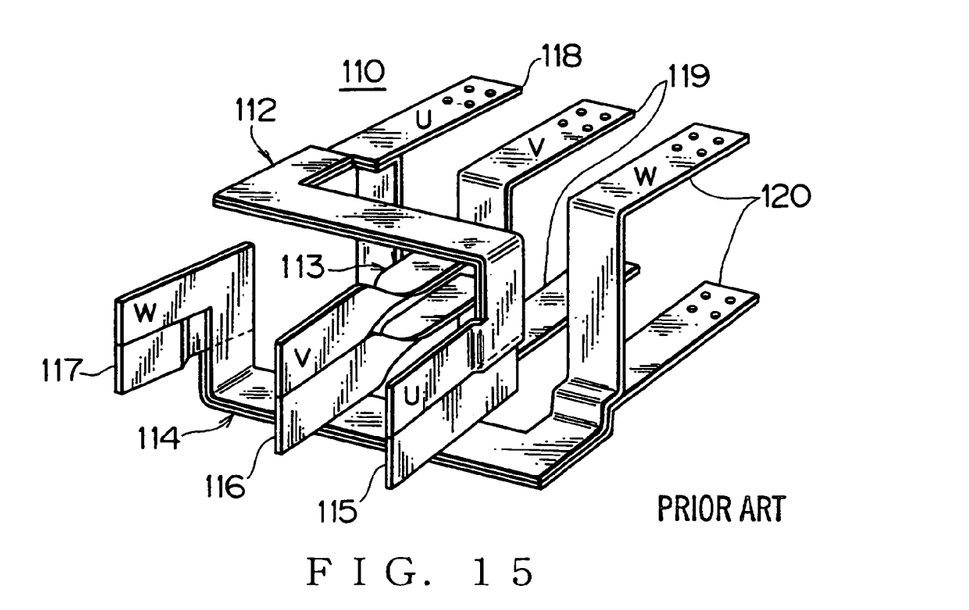
FIG. 15 is a perspective view illustrating an example of a conventional busbar structure.

As another prior art, a busbar structure shown in FIG. 15 is described in Patent Publication 2.

A busbar structure 110 is received, for example, in a casing of a cable terminus junction box (not shown in the figure) which connects a transformer to an accessory apparatus for power distribution in a power plant. Ends 115-117 of the respective busbars 112-114 that construct the busbar structure 110 are connected to corresponding connecting terminals (not shown in the figure) existing in a socket through connecting conductors (not shown in the figure). The other ends 118-120 of the respective busbars 112-114 are connected to corresponding cable (not shown in the figure) through connecting plates (not shown in the figure).

Each of the ends 115-117 of the respective busbars 112-114 is joined with another corresponding end in the plate width direction of the busbar and arranged in a line in a sequence of UVW poles from the right. Each middle portion of the busbars 112-114 is bent in a desired shape on a condition being laminated in the plate thickness direction of the busbar. Each of the other ends 118-120 of the respective busbars 112-114 is separated up and down and arranged in parallel from the left in a sequence of UVW poles. Both ends of the respective busbars 112-114 are connected and fixed to connecting conductors or connecting plates by bolting through respective joint plates (not shown in the figure).

Patent Publication 1: Japanese Patent Application Laid-Open No. H11-126661 (pages 2-3, FIGS. 1 and 4)

Patent Publication 2: Japanese Patent Application Laid-Open No. H8-126182 (pages 3-4, FIG. 1)

DISCLOSURE OF THE INVENTION

Problems that the Invention is to Solve

However, in the structure in which the conventional direct mounting connector (FIGS. 11-12) as described above is used, for example, as shown in FIG. 14, a wiring of the circuits 65-67 such as busbars for connecting the apparatus main part (converter) 64a to the respective poles (UVW) of the respective connectors 61, 61' is complicated in the case of the apparatus 64, causing the apparatus 64 being enlarged. Further, since the circuits 65-67 is complicated, therefore the connecting work is troublesome, many man-hour is required, and connection errors might occur.

Moreover, the apparatus is provided with a current sensor for controlling current values as to the circuits 65-67, also causing the apparatus 64 being enlarged.

Figure 16:
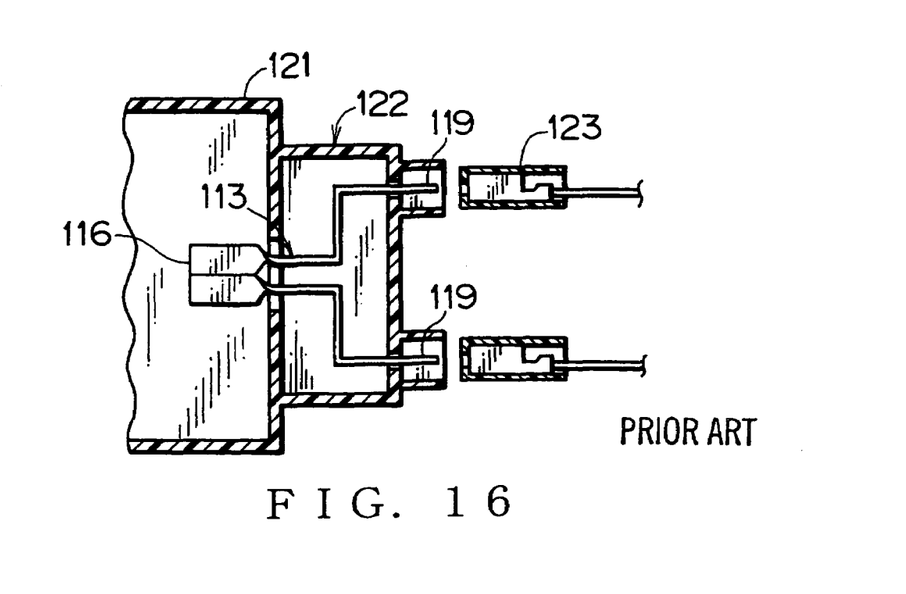
FIG. 16 is a longitudinal cross sectional view of a primary part illustrating a first example of a direct mounting connector to which a conventional busbar structure is applied.

In the conventional busbar structure 110 (FIG. 15) as described above, the connecting conductors and the connecting plates are connected through the joint plates. For example, in the event that the conventional busbar structure 110 is applied to a direct mounting connector, as shown in FIG. 16, one end 116 of a busbar 113 is arranged within a case of an apparatus 121, a middle portion of the busbar 113 is arranged being bent in the direct mounting connector 122, opposite ends 119 of the busbar 113 are rendered to project in the horizontal direction in parallel up and down, and on this condition a mating connector 123 is connected thereto from the projection direction (horizontal direction) of the opposite end 119 of the busbar 113. Therefore, the connecting structure of the connector might be undesirably enlarged in the projecting direction of the busbar.

Figure 17:
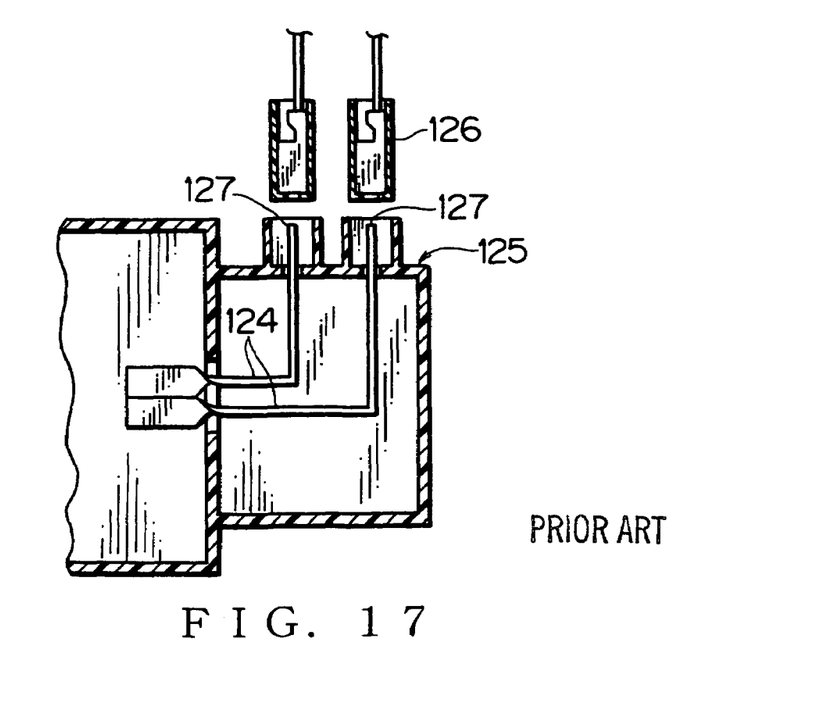
FIG. 17 is a longitudinal cross sectional view of a primary part illustrating a second example of a direct mounting connector to which a conventional busbar structure is applied.

Further, as shown in FIG. 17, in a case when as shown in FIG. 17, two busbars 124 are bent upward within a direct mounting connector 125 so as to be connected to a mating connector 126, since respective opposite ends 127 of the respective busbars 124 are arranged in two rows in front and rear, therefore the connecting structure, i.e. the direct mounting connector 125 might undesirably be enlarged in the row direction (horizontal direction) of the opposite ends 127 of the busbars 124. These problems might equally occur in such a case that the direct mounting connector 122 or 125 shown in FIG. 16 or 17 is arranged being reversed by 90 degrees.

It is therefore an objective of the present invention to solve the above problems and to provide a direct mounting connector, by which the apparatus can be compact, the connection to the apparatus can be easily efficiently securely carried out, and the connecting structure can be compact.

Means of Solving the Problems

In order to attain the above objective, a connector directly mounted on an apparatus (i.e. direct mounting connector) of the present invention is a direct mounting connector to be directly mounted on an apparatus, including:

six independent busbars for connecting the apparatus to two auxiliary machines of three-phase alternating current;

two first terminal parts of U-pole, two first terminal parts of V-pole and two first terminal parts of W-pole of three-phase alternating current, altogether the six first terminal parts being formed at first ends of the respective busbars and being to connect with the apparatus, the two first terminal parts of the same pole being arranged adjacently to each other; and two sets, each set of which consists of a second terminal part of U-pole, a second terminal part of V-pole and a second terminal part of W-pole, altogether the six second terminal parts being formed at second ends of the respective busbars and being to connect with the auxiliary machines, the two sets being arranged adjacently to each other having a distance therebetween.

With the construction described above, the two sets of the three circuits from the respective two auxiliary machines such as motors are separately connected to the corresponding two sets of three second terminal parts of U, V and W-poles situated at the second ends of the six independent busbars. Three pairs, that is, a pair of the two first terminal parts of U-pole, a pair of the two first terminal parts of V-pole and a pair of the two first terminal parts of W-pole situated at the first ends of the six busbars are mutually lined up and separately connected to the respective circuits on the side of the apparatus. For example, the pole phases of the second terminal parts situated at the second ends of the six busbars are formed as the two sets of $U_1W_1V_1$ and $V_2U_2W_2$ in its arranged sequence, while the pole phases of the first terminal parts situated at the first ends of the six busbars are formed as the three pairs, that is, a pair of $U_1U_2$, a pair of $V_1V_2$ and a pair of $W_1W_2$ in its arranged sequence. That is, A part of the busbars (two out of six) are arranged mutually being mixed between the two sets of the second terminal parts situated at the second ends of the busbars. Thereby, the two sets of the second terminal parts situated at the second ends construct respective two connector connecting parts arranged adjacently in a line and the connectors of the circuits on the side of the auxiliary machines are fit-connected to the two connector connecting parts with good workability approximately at the same position from the same direction. Further, the structure of the connecting circuit on the side of the apparatus is simplified by the first terminal parts lined up with respect to the pole phases at the first ends of the busbars, and the work for the connection can be efficient. Since the two sets of the second terminal parts situated at the second ends of the busbars are independently connected to the respective circuits on the side of the motors, therefore the voltage control (current control) for the respective motors is possible.

A connector directly mounted on an apparatus is, as to the connector, characterized in that the busbars include extended parts extending between the two sets of the second terminal parts.

With the construction described above, the work, in which a part of the busbars (two out of six) are arranged mutually being mixed between the two sets of the second terminal parts situated at the second ends of the busbars, can be easy and secured. The arrangement of the U, V and W-poles can be freely selected depending upon which busbars are to be extended.

A connector directly mounted on an apparatus is, for the connector, characterized in that the first terminal parts connect with the corresponding second terminal parts through respective U-shaped bent parts.

With the construction described above, since the first terminal parts protrude from the depth compared to the second terminal parts having the bent part as a base end, therefore the depth inside the direct mounting connector is increased and parts to be arranged along the first terminal parts within the direct mounting connector can be received up to the depth, so that the direct mounting connector can be compact in the protruding direction of the first terminal parts. Further, since the stiffness of the busbars can be improved by the bent part having a U-shape, therefore the second terminal parts can be prevented from being bent or deformed when the mating connectors are connected to the second terminal parts.

A connector directly mounted on an apparatus is, as to the connector, characterized in that the second terminal part of the busbar continues to the extended part through a step part and the extended part is flush with the other extended part of the other busbar.

With the construction described above, since the first terminal parts protrude from the depth compared to the second terminal parts having the step part-side as a base end, therefore the depth inside the direct mounting connector is increased and parts to be arranged along the first terminal parts within the direct mounting connector can be received up to the depth, so that the direct mounting connector can be compact in the protruding direction of the first terminal parts. Further, since the stiffness of the busbars can be improved by the step crossing at right angles, therefore the second terminal parts can be prevented from being bent or deformed when the mating connectors are connected to the second terminal parts.

A connector directly mounted on an apparatus is, as to the connector, characterized in that the busbars are molded in respective insulating resin parts.

With the construction described above, the busbars are mutually insulated from one another by the insulating resin parts and fixed so as to construct the busbar assembly. The busbar assembly can be easily mounted in a case or shield shell of the connector.

A connector directly mounted on an apparatus is, as to the connector, characterized in that the U-shaped bent parts and/or the step parts are molded in the respective insulating resin parts.

With the construction described above, the fixing strength of the busbars is increased, the stiffness of the second terminal parts is improved, and the posture of the second terminal parts upon the connection of the mating connectors can be stabilized.

A connector directly mounted on an apparatus is, as to the connector, characterized in that current sensors are arranged inside the respective insulating resin parts, wherein the first terminal parts penetrate through the respective current sensors.

With the construction described above, in the inside space of the insulating resin part, the first terminal part protrudes from the depth (from an inner surface of the insulating resin part), the depth of the inside space is increased, and the current sensor is arranged in the depth. Thereby, the inside space can be shortened in the protruding direction of the first terminal part and the direct mounting connector can be compact. Further, there is no need to arrange the current sensor within the apparatus, that is, the apparatus can be compact. Since the current sensors (for detecting current values of the circuits) are disposed for four busbars out of the six busbars, therefore the direct mounting connector can be compact.

Effects of the Invention

As described above, according to the invention, since the structure of the connecting circuit on the side of the apparatus is simplified by the first terminal parts lined up with respect to the pole phases at the first ends of the busbars, therefore the apparatus can be compact. Further, since the circuits on the side of the apparatus can be securely connected to the first terminal parts lined up with respect to the pole phases with good workability, therefore the connection workability and connection quality of the apparatus is improved. Since the two sets of the second terminal parts situated at the second ends construct respective two connector connecting parts arranged adjacently in a line and the connectors of the circuits on the side of the auxiliary machines are fit-connected to the two connector connecting parts with good workability approximately at the same position from the same direction, therefore the connection workability of the apparatus and the auxiliary machines is improved. Since the two sets of the second terminal parts are independent from each other, therefore for example, different values of voltage (current) are supplied to motors situated left and right of an electric vehicle so that the two motors can be separately driven at a sharp bend and a charge can be efficiently carried out for the respective motors upon an action of a regeneration brake.

According to the invention, since the arrangement of the U, V and W-poles can be freely selected depending upon which busbars are to be extended, therefore the setting up of the pole phases of the direct mounting connector can be easily carried out according to the pole phases arrangement of the circuits of the apparatus or auxiliary machines, thereby improving the degree of freedom and flexibility of designing.

According to the invention, the space for receiving the first terminal parts in the direct mounting connector is enlarged in the depth direction, so that the direct mounting connector can be compact in the protruding direction of the first terminal part.

According to the invention, the space for receiving the first terminal parts in the direct mounting connector is enlarged in the depth direction, so that the direct mounting connector can be compact in the protruding direction of the first terminal part.

According to the invention, the insulating characteristic among the busbars is improved and reliability of the electric connection is improved. The busbars can be mounted within the direct mounting connector as the busbar assembly with good workability, thereby improving the productivity of the connector. If the respective busbars are insert-molded with insulating resin material within the connector, the productivity of the connector can be further improved.

According to the invention defined, the stability of the second terminal parts is improved, and the connection to the mating connectors can be precisely carried out, thereby improving reliability of the electric connection.

According to the invention, since the depth of the inside space of the insulating resin part is increased and the current sensor is arranged in the depth, therefore the inside space can be shortened in the protruding direction of the first terminal part, so that the direct mounting connector can be compact.

ABBREVIATION NUMERALS 1, 100: direct mounting connector
2: inverter (apparatus)
5: housing
6, 108: insulating resin part
7: current sensor
11, 12, 82, 83: terminal part of U-pole
13, 14, 84, 85: terminal part of V-pole
15, 16, 86, 87: terminal part of W-pole
21-26, 88-93: busbar
22c, 25c, 22c', 25c', 89c, 92c: extending part
31-33, 34-36, 94-96, 97-99: female terminal each for U-pole, V-pole and W-pole (two sets of female terminals)
41, 42: motor (auxiliary machine)
89f: step part
107: U-shaped bent part

BEST MODE FOR CARRYING OUT THE INVENTION

In the following, the preferred embodiments of the present invention are explained in detail with reference to the attached drawings.

Figure 1:
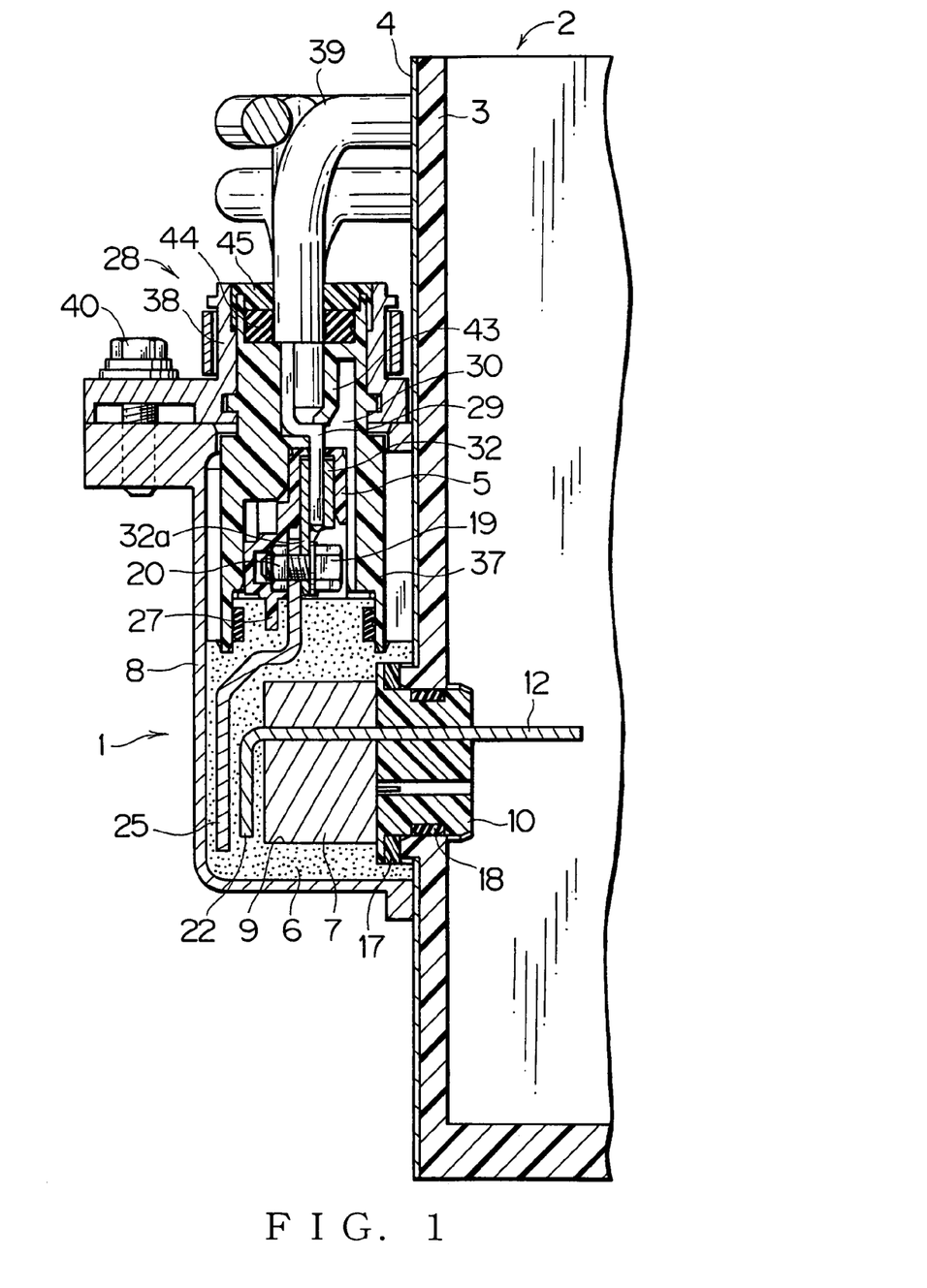
FIG. 1 is a longitudinal cross sectional view illustrating a preferred embodiment of a direct mounting connector according to the present invention.
Figure 2:
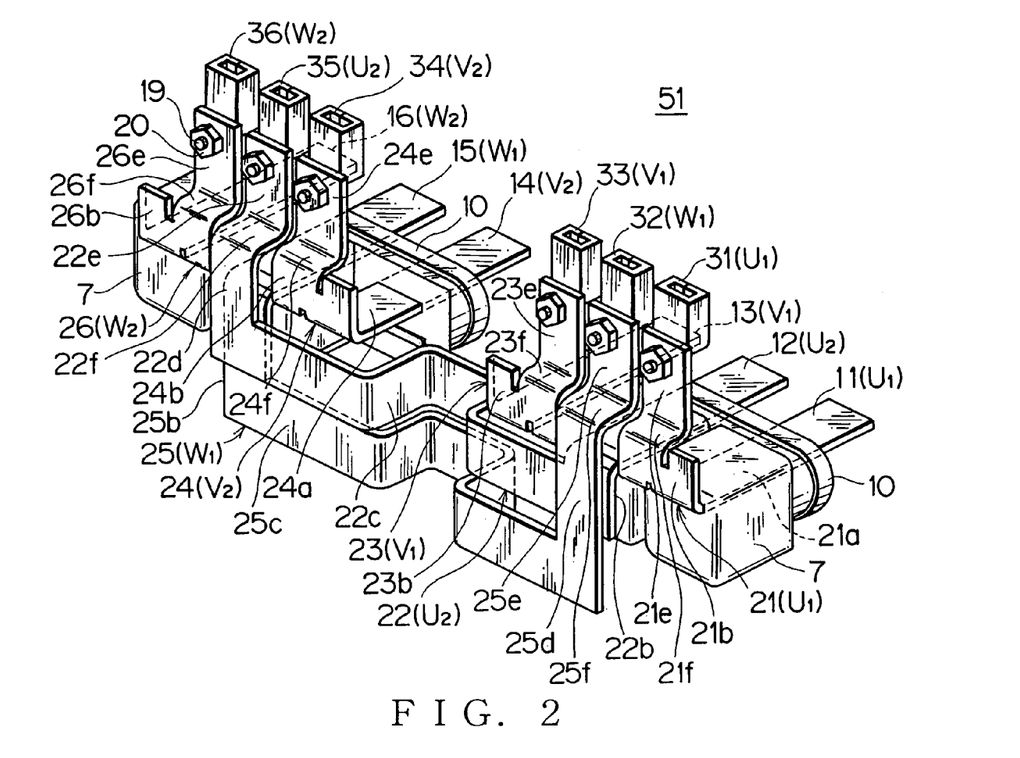
FIG. 2 is a perspective view illustrating a preferred embodiment of a busbar structure of a direct mounting connector.

FIG. 1 shows a preferred embodiment of a direct mounting connector according to the present invention. FIG. 2 shows a preferred embodiment of a busbar arranging structure in the direct mounting connector.

The direct mounting connector 1 includes at least: six busbars 21-26 having six terminal parts 11-16 (see FIG. 2), which penetrate through a case 3 of an apparatus (inverter) 2, at one side of the busbars; female terminals (terminal parts) 31-36 (see FIG. 2) connected and fixed to an opposite side of the busbars with bolts 19; housings 5 made of electrically insulating resin for receiving the female terminals 31-36; insulating resin parts (cases) 6 which fix the busbars 21-26 in an electrically insulating manner by means of insert molding; current sensors 7 arranged in the respective insulating resin parts 6; and a shield shell 8 made of electrically conductive metal which covers the insulating resin parts 6 and the housings 5.

The terminal parts 11-16 of the respective busbars 21-26 are arranged in a sequence of U, U, V, V, W, W-poles. The terminal parts 11-16 are arranged in an intermixed manner with regard to the three female terminals 31-33 and the three female terminals 34-36 connected to the three electric wires 39 and the three electric wires 39, respectively, guided out from two motors (auxiliary machines) 41 and 42 (see FIG. 3), which is explained later on.

As shown in FIG. 1, the busbars 21-26 are fixed in an electrically insulating manner within the shield shell 8 by means of molding, the busbars 21-26 are connected to the female terminals 31-36, the six female terminals 31-36 are divided into two groups and inserted in the two housings 5, then the current sensor 7 is mounted thereto. A recess part 9 for mounting the current sensor 7 is in advance formed in the insulating resin part 6. The above construction is effective as a preferred embodiment of a process for producing the direct mounting connector. Instead, the molding of the busbars 21-26 may be carried out in a separate step so that thereafter the busbar assembly is mounted within the shield shell 8. The six female terminals 31-36 are provided with regard to the six busbars 21-26.

A block 10 made of insulating resin is joined to the current sensor 7. The busbars 21-26 penetrate through a hole part of the current sensor 7 and the insulating block 10 (instead, there being a case in which the busbars 21-26 do not penetrate through the current sensor 7) and the terminal parts 11-16 thereof project in the case 3 of the apparatus 2. The current sensor 7 may be, for example, a known sensor composed of a conductive core having a coil-shape and a Hall device (not shown). (As for the current sensor 7, for example, see FIG. 3 of Japanese Patent Application Laid-Open No. 2002-257866.) The current sensor 7 is waterproofed in such a manner that a fluid resin material such as silicon is filled from above the insulating block 10 so as to solidify the resin material (to be soft resin member 17). The insulating block 10 is inserted into a hole in the case 3 of the apparatus 2 and the insertion part is waterproofed with a packing 18. The shield shell 8 comes in contact with a conductive metal part 4 on an outer surface of the case 3, thereby attaining the grounding.

The bolts 19 are inserted through holes of the respective busbars 21-26 and female terminals 31-36 and screwed to nuts 20, thereby attaining the fixing between respective both. The nuts 20 are welded and fixed to the busbars 21-26 or to the female terminals 31-36 or, alternatively, in advance held or fixed within the housings 5. In the preferred embodiment shown in FIG. 1, the nuts 20 are held within the housings 5, projections 27 of the housings 5 engage with the recess parts of the insulating resin parts, thereby positioning respective both, and the busbars 21-26 are fixed to the respective nuts 20 on the side of the housings 5, so that the insulating resin parts 6 and the housings 5 are fixed with respect to each other. The arrangement of the bolts 19 and the nuts 20 as described above may be changed according to a need.

Each of the female terminals 31-36 within the housings 5 integrally includes: a rectangular cylindrical electric contact part having a resilient contact part on one side of the female terminal; and a busbar-connecting part 32*a* (see FIG. 1) on an opposite side of the female terminal. Since the female terminals 31-36 do not protrude outward as the male terminals do and are insulated within the housings 5, therefore there is no risk of electric shock when a mating connector 28 is fit and connected to the direct mounting connector 1.

The mating connector 28 is fit and connected to the direct mounting connector 1 perpendicularly from above. The mating connector 28 includes at least: male terminals 29 each having an electric wire; a housing 37 made of insulating resin having a connector fitting chamber 30 for allowing the male terminals to protrude; and a shield shell 38 made of conductive metal mounted on the outside of a base of the housing 37. The six electric wires 39 are guided out from the two motor (auxiliary machines) 41 and 42 (see FIG. 3) three by three each with U, V and W-poles.

Flange parts of the shield shells 8 and 38 of the respective connectors 1 and 28 are connected and fixed to each other with bolts 40. A shoulder part of the male terminal 29 is locked by a flexible lance 43 of the housing 37. The electric wire 39 is shield with a waterproof plug 44 which is pressed by a rear holder 45. Each male terminal 29 is crimp-connected to the corresponding electric wire 39.

Figure 3:
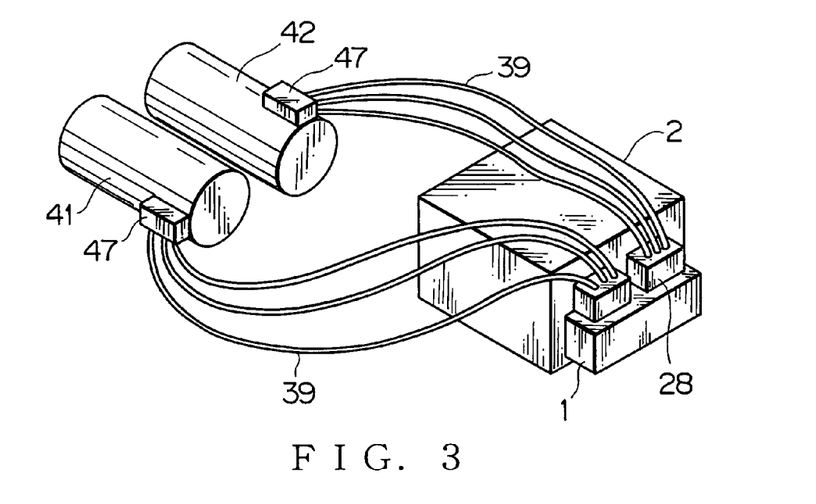
FIG. 3 is a perspective view illustrating a preferred embodiment of a connecting structure of a motor (auxiliary machine) and an inverter (apparatus).

As shown in FIG. 3, the respective three electric wires 39 guided out from the two motor 41 and 42 are connected to the one direct mounting connector 1 through the two mating connectors 28. The direct mounting connector 1 has two connector-fitting parts (i.e. housings 5) situated left and right. The direct mounting connector 1 is fixed on a wall (a perpendicular wall in this preferred embodiment) of the apparatus 2. In the following, an arranging structure of the busbars 21-26 within the direct mounting connector 1 is explained.

As shown in FIG. 2, the terminal parts 11-16 of the six busbars 21-26 are arranged in a line in a sequence of $U_1$, $U_2$, $V_1$, $V_2$, $W_1$, $W_2$-poles from the right. There is shown a pole-phase in each parenthesis in FIG. 2. As for the busbar 21, a horizontal terminal part 11 of $U_1$-pole situated at the right end continues to an upward short perpendicular part 21*b* through a horizontal part 21*a* that penetrates through the resin block 10 and the current sensor 7, then the perpendicular part 21*b* is bent upward in a L-shape having a step and continues to a female terminal-connecting part 21*e* through a horizontal short plate part 21*f*. The female terminal 31, which continues to the connecting part 21*e*, situated at the right end is $U_1$-pole.

As for the busbar 22, a horizontal terminal part 12 of $U_2$-pole situated second from the right is bent downward shortly perpendicularly through a horizontal part that penetrates through the insulating block 10 and the current sensor 7, then its perpendicular part 22*b* is extended long to the left in a crank-shape and the left end of an extended part 22*c* continues to an upward perpendicular part 22*d*, and the perpendicular part 22*d* is bent in a L-shape having a step and continues to a perpendicular female terminal-connecting part 22*e* situated second from the left through a horizontal short plate part 22f. The female terminal 35, which continues to the connecting part 22e, situated second from the left is $U_2$-pole.

As for the busbar 23, a horizontal terminal part 13 of $V_1$-pole situated third from the right penetrates through only the insulating block (the current sensor 7 not being at a place where the terminal part 13 exists), a horizontal part thereof continues to an upward short perpendicular part 23b, and the perpendicular part 23b is bent in a L-shape having a step and continues to a perpendicular female terminal-connecting part 23e situated third from the right through a horizontal short plate part 23f. The female terminal 33, which continues to the connecting part 23e, situated third from the right is $V_1$-pole.

As for the busbar 24, a horizontal terminal part 14 of $V_2$-pole situated fourth from the right penetrates through only the insulating block, a horizontal part 24a thereof continues to an upward short perpendicular part 24b, and the perpendicular part 24b is bent in a L-shape having a step and continues to a perpendicular female terminal-connecting part 24e situated fourth from the right through a horizontal short plate part 24f. The female terminal 34, which continues to the connecting part 24e, situated fourth from the right is $V_2$-pole. The busbar 23 situated third from the right is formed symmetrically left and right with respect to the busbar 24 situated fourth from the right.

As for the busbar 25, a horizontal terminal part 15 of $W_1$-pole situated fifth from the right is bent downward relatively long perpendicularly through a horizontal part that penetrates through the insulating block 10 and the current sensor 7, then its perpendicular part 25b is extended long to the right in a crank-shape and the right end of an extended part 25c continues to an upward perpendicular part 25d, and the perpendicular part 25d is bent in a L-shape having a step and continues to a perpendicular female terminal-connecting part 25e situated second from the right through a horizontal short plate part 25f. The female terminal 32, which continues to the connecting part 25e, situated second from the right is $W_1$-pole. The busbar 25 having the terminal part 32 situated second from the right is formed symmetrically left and right with respect to the busbar 22 having the terminal part 35 situated second from the left. The extended part 25c of the busbar 25 is positioned in the proximity of the lower side of the extended part 22c of the busbar 22.

As for the busbar 26, a horizontal terminal part 16 of $W_2$-pole situated sixth from the right (i.e. situated at the left end) continues to an upward short perpendicular part 26b through a horizontal part that penetrates through the insulating block 10 and the current sensor 7, then the perpendicular part 26b is bent upward in a L-shape having a step and continues to a female terminal-connecting part 26e through a horizontal short plate part 26f. The female terminal 36, which continues to the connecting part 26e, situated at the left end is $W_2$-pole. The busbar 21 having the terminal part 31 situated at the right end is formed symmetrically left and right with respect to the busbar 26 having the terminal part 36 situated at the left end.

As described above, the terminal parts 11-16 for connecting to the apparatus 2 (see FIG. 1) are arranged in a line in a sequence of $U_1$, $U_2$, $V_1$, $V_2$, $W_1$, $W_2$-poles from the right, while the female terminals 31-36 for connecting to the mating connectors 28 situated on the side of the electric wires 39 guided out from the first and second motors 41, 42 are arranged in a line in a sequence of $U_1$, $W_1$, $V_1$, $V_2$, $U_2$, $W_2$-poles from the right. A busbar assembly 51 is composed of at least the busbars 21-26 and the insulating resin parts 6 (see FIG. 1) for molding. (In FIG. 2, the resin part 6s are omitted and not shown.)

Figure 4:
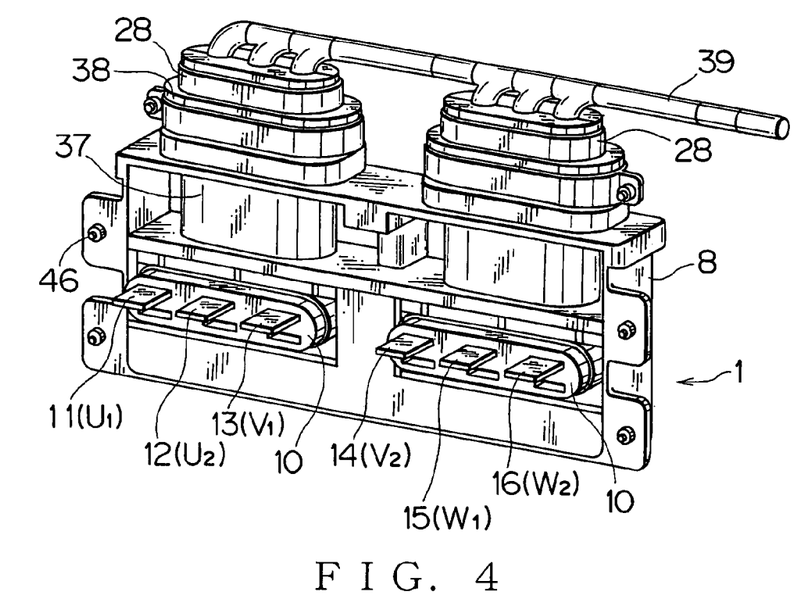
FIG. 4 is a perspective view illustrating a preferred embodiment of a direct mounting connector.

As shown in FIG. 4, the three terminal parts 11-13 of the $U_1$, $U_2$ and $V_1$-poles of the left half (i.e. right half in FIG. 2) are fixed by a long from side to side insulating block 10, while the three terminal parts 14-16 of the $V_2$, $W_1$ and $W_2$-poles of the right half (i.e. left half in FIG. 2) are fixed by a long from side to side insulating block 10, and the two insulating blocks 10 are arranged in a line in a long from side to side shield shell 8. The three female terminals 31-33 of the $U_1$, $W_1$ and $V_1$-poles of the right half in FIG. 2 are arranged in a connector-fitting chamber 30 of one housing 37 (see FIG. 1), while the three female terminals 34-36 of the $V_2$, $U_2$ and $W_2$-poles of the left half in FIG. 2 are arranged in a connector-fitting chamber 30 of another housing 37, and the housings 37 are arranged in the respective shield shells 38.

The shield shell 8 of the direct mounting connector 1 is fixed on the apparatus 2 (see FIG. 3) with the bolt 46. The pole phases of the three male terminals 29 (see FIG. 1) of the respective two mating connectors 28 are arranged in the same manner as the pole phases of the female terminals 31-36. In a preferred embodiment shown in FIG. 4, the six electric wires 39 of the mating connectors 28 are bundled and guided to the connectors 47 (see FIG. 3) situated on the side of the motors 41 and 42.

Figure 5:
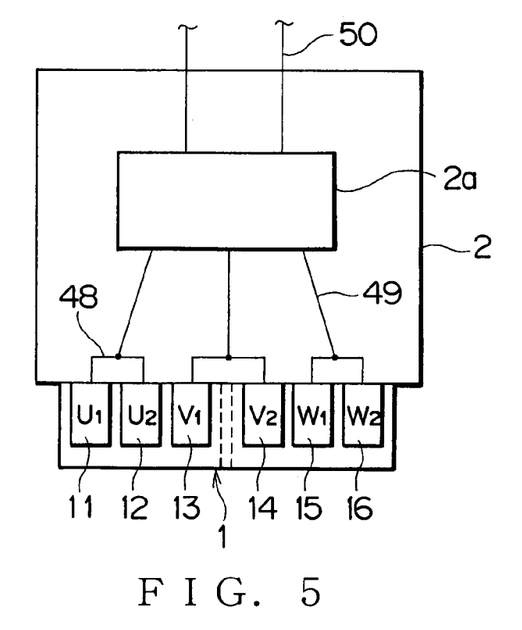
FIG. 5 is a view illustrating a preferred embodiment of a circuit connecting state of an inverter (apparatus) and a direct mounting connector.

FIG. 5 shows a circuit connecting state of the apparatus 2 and the direct mounting connector 1.

As shown in the busbar structure described above, the respective adjacent two terminal parts (i.e. $U_1$ and $U_2$, $V_1$ and $V_2$, and $W_1$ and $W_2$) of the terminal parts 11-16 of the direct mounting connector 1 are connected to each other by a short joint circuit (such as a busbar) 48, so that only three busbars 49 are sufficient enough to connect the direct mounting connector 1 to an apparatus main body (i.e. inverter) 2a within a case. Therefore, in comparison with the conventional busbar structure, the busbar structure according to the present invention enables simplification, weight saving, cost reducing and space saving of the busbar structure and small size of the apparatus 2. The inverter 2a continues to two direct current circuits 50 on the side of a battery. As shown in FIG. 4, the connection of the mating connectors 28 to the direct mounting connector 1 can be carried out efficiently with good workability simultaneously or one by one at adjacent positions.

In a case in which the two motors are driven by different voltages (currents) such as in a case in which the two motors are driven with different revolution numbers at a sharp bend without a differential mechanism of a vehicle, the respective busbar terminal parts 11-16 are separately connected to the apparatus main body 2a, however even in such a case, six busbars 49 are arranged in a line, thereby attaining simplification and space saving of the busbar structure.

Further, as shown in FIG. 1, since the current sensor 7 is arranged within the direct mounting connector 1, therefore space saving in the apparatus is attained and the apparatus 2 can be compacted. As shown in FIG. 2, since the current sensors 7 are arranged with regard to the terminal parts 11 and 12 (for $U_1$ and $U_2$-poles) and the terminal parts 15 and 16 (for $W_1$ and $W_2$-poles) in order to detect current values, therefore the direct mounting connector 1 can be small. Further, since the current sensor 7 is disposed outside the apparatus 2, therefore the current sensor 7 can be easily cooled down. Furthermore, since the current sensor 7 is completely shielded by the shield shell 8, therefore there is no risk of malfunction. The waterproof can be perfect with a double structure consisting of the packing 18 (see FIG. 1) and the silicon filler 17.

Figure 6:
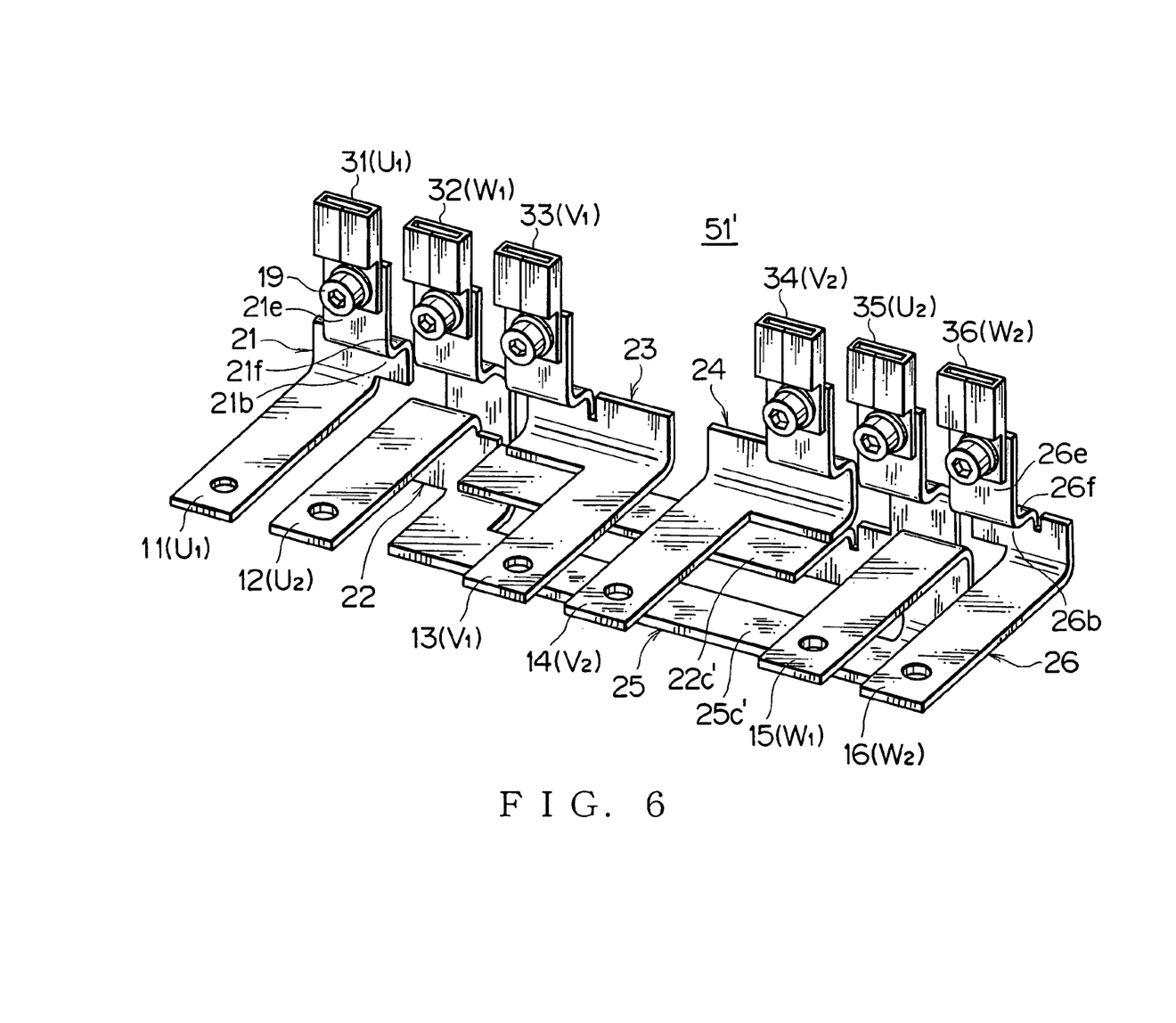
FIG. 6 is a perspective view illustrating another preferred embodiment of a busbar structure of a direct mounting connector.

FIG. 6 shows another preferred embodiment of a busbar assembly which is similar to the busbar structure shown in FIG. 2. (In FIG. 6, the insulating resin parts 6 are omitted and not shown.)

In a busbar structure shown in FIG. 6, an extended part 22c' of a busbar 22 having a terminal part 12 situated second from the left and an extended part 25c' of a busbar 25 having a terminal part 15 situated second from the right are not placed perpendicularly as in FIG. 2 but placed horizontally, so that a busbar assembly 51' can be compact in the height direction thereof.

The horizontal extended parts 22c' and 25c' extend straight without unevenness in the thickness direction thereof. For example, the extended parts 22c and 25c of the respective busbars 22 and 25 shown in FIG. 2 are made straight without unevenness in the thickness direction thereof and are bent horizontally from the perpendicular parts 22d and 25d that continue to the respective female terminal-connecting parts 22e and 25e, thereby obtaining the busbar structure shown in FIG. 6.

Similarly to the embodiment shown in FIG. 2, in the busbar structure shown in FIG. 6, the busbars 21 and 26 situated the right and left ends are symmetrical to each other, the busbars 22 and 25 having the terminal part 12 situated second from the left and the terminal part 15 situated second from the right, respectively, are approximately symmetrical to each other, the extended part 25c' of the busbar 25 is disposed in parallel below the extended part 22c' of the busbar 22, and the busbars 23 and 24 having the terminal part 13 situated third from the left and the terminal part 14 situated third from the right, respectively, are symmetrical to each other. Therefore, the design and manufacture of the busbars 21-26 are easy with a low cost.

In FIG. 6, the terminal parts 11-16 are arranged in a line in the sequence of $U_1, U_2, V_1, V_2, W_1, W_2$ from the left, while the female terminals 31-36 are arranged in a line in the sequence of $U_1, W_1, V_1, V_2, U_2, W_2$ from the left. The two sets of the female terminals 31-33 and 34-36 have the same pitch, wherein the terminals 33 and 34 are situated away from each other largely, while the adjacent two terminal parts 11 and 12 in the pair, 13 and 14 in the pair, and 15 and 16 in the pair have the same pitch, and the respective pairs of the two terminal parts, that is, a pair of 11 and 12, a pair of 13 and 14, and a pair of 15 and 16 are situated away from one another largely. The female terminal-connecting parts 21e-26e of the respective busbars 21-26 are bent in a L-shape having a step and continue to the middle perpendicular parts 21b-26b of the respective busbars 21-26 through the horizontal short plate parts 21f-26f.

In the preferred embodiment described above, the direct mounting connector 1 includes the current sensor 7. However, if the apparatus 2 has a space for mounting the current sensor 7 therein, it is not necessary to mount the current sensor 7 on the side of the connector 1.

Further, the sequence of the arrangement of the pole phases in the busbar structure described above may be, for example, $U_1, U_2, W_1, W_2, V_1, V_2$. That is, two terminal parts having the same pole phases must be arranged adjacently to each other. According to such a sequence as described above, the sequence of the pole phases of the female terminals 31-36 can be changed, for example, from U, W, V to U, V, W.

Further, as for a position where there is no risk of electric shock, the arrangement of the female terminals 31-39 and the male terminal 29 may be reversed up and down. In this case, the male terminals are connected to the busbars 21-26 with bolts. Alternatively, the male terminals are formed integrally with the busbars 21-26. Further, the male terminals are connected to the busbars 21-26 by welding or soldering, instead of bolting. Although the female terminals 31-36 can be formed integrally with the busbars 21-26, the female terminals 31-36 are preferably not integral with the busbars 21-26 because the shapes of the respective busbars 21-26 are different from one another and therefore the formation of the female terminals requires a lot of time.

In a case in which there are four auxiliary machines such as four motors, two sets of the busbar assemblies 51 or 51' shown in FIG. 2 or FIG. 6, respectively, may be formed by using twelve busbars. In the present invention, at least six busbars 21-26 are required. For example, the busbars 21-26 may be formed being bent so that the respective pairs of the busbar terminal parts 11 and 12, 13 and 14, and 15 and 16, each having the same pole phase, are not arranged in a line left and right but arranged in a line up and down. Further, the six female terminals 31-36 may be received in one housing 37. The two connectors 28 that continue to the electric wires 39 on the side of the motors may be incorporated into one connector.

FIGS. 7-10 show further preferred embodiments of the busbar structure and the direct mounting connector using such a busbar structure.

Figure 7:
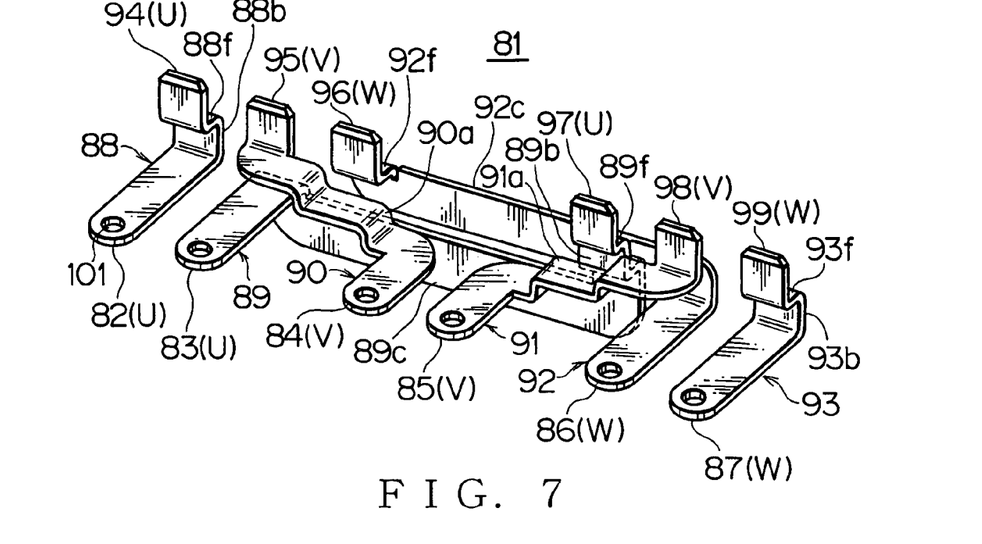
FIG. 7 is a perspective view illustrating another preferred embodiment of a busbar structure.

As shown in FIG. 7, in a busbar structure 81, middle portions of busbars 90, 91 having a perpendicular tab-shaped terminal part 95 situated second from the left and a perpendicular tab-shaped terminal part 98 situated second from the right, respectively, are bent inward in a step-shape, the step parts (bent parts) 90a and 91a are made continue to respective horizontal terminal parts 84 and 85 situated third from the left and right, respectively, middle portions of busbars 89, 92 having a perpendicular tab-shaped terminal part 96 situated third from the left and a perpendicular tab-shaped terminal part 97 situated third from the right, respectively, are extended inward, and the extended parts 89c and 92c are made continue to respective horizontal terminal parts 83 and 86 situated second from the left and right, respectively.

The step parts 90a and 91a cross at right angles with the respective horizontal terminal parts 84 and 85 in a horizontal plane. In FIG. 7, the step part has two steps. However, the step part may have only one step. The tab-shaped terminal part 97 situated third from the right continues to the extended part 89c through the step part (bent part) 89f having two steps, the tab-shaped terminal part 96 situated third from the left continues to the extended part 92c through a horizontal short plate part 92f having one step, the extended part 92c is situated in parallel facing the rear of a perpendicular plate part 89b that continues to the step part 89f, and the extended parts 89c and 92c extend in the horizontal direction being arranged in parallel up and down on the same perpendicular plane.

Tab-shaped terminal parts 94 and 99 situated at the left and right ends, respectively, continue to the respective horizontal terminal parts 82 and 87 in a crank-shape through the horizontal short plate parts 88f and 93f and the perpendicular plate parts 88b and 93b that continue to plate parts 88f and 93f, respectively. The perpendicular tab-shaped terminal parts 94-99 of the respective busbars 88-93 act as male terminals by themselves differently from the busbar structures as described in the former preferred embodiments. The horizontal terminal parts 82-87 are connected to a busbar circuit (not shown) situated on the side of the apparatus by means of holes 101 similarly to those of the former preferred embodiments.

The perpendicular tab-shaped terminal parts (terminal parts situated at the second end of the busbar) 94-99 are arranged in a sequence of U, V, W-U, V, W-pole from the left, while the horizontal terminal parts (terminal parts situated at the first end of the busbar) 82-87 are arranged in a sequence of U, U-V, V-W, W-pole from the left. The busbars 88 and 93 situated at the left and right ends, respectively, are arranged symmetrically, the busbars 90 and 91 having the tab-shaped terminal parts 95 and 98 situated second from the left and right, respectively, are arranged symmetrically left and right, and the busbars 89 and 92 having the extended parts 89c and 92c that continue to the tab-shaped terminal parts 96 and 97 situated third from the left and right, respectively, are arranged approximately symmetrically left and right.

Figure 8:
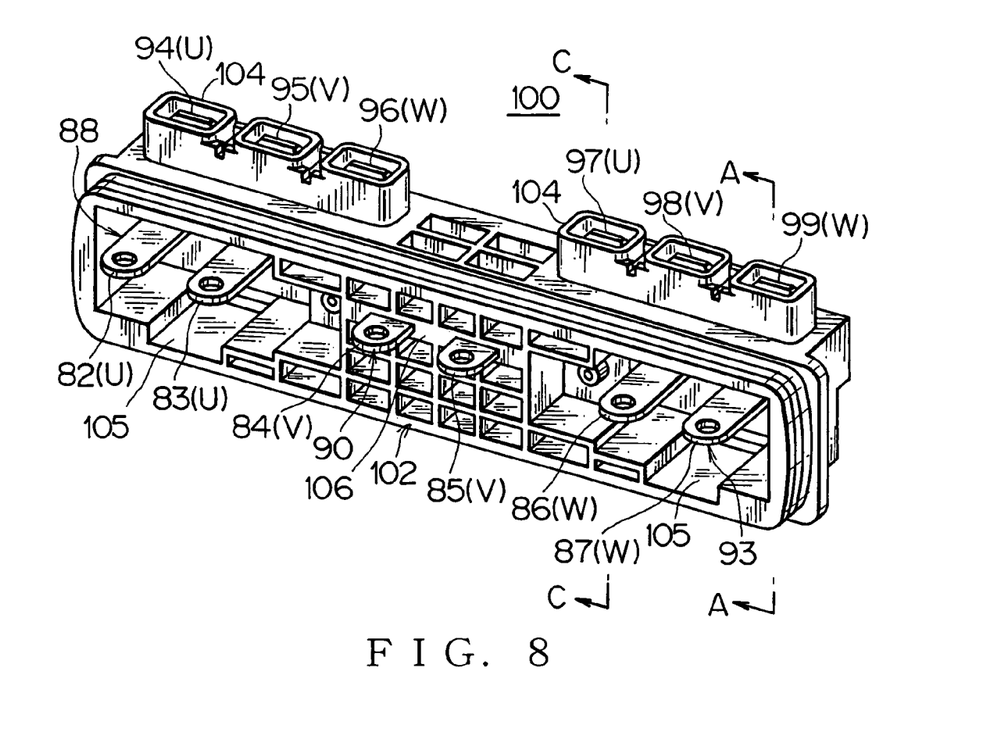
FIG. 8 is a perspective view illustrating a preferred embodiment of a direct mounting connector to which the busbar structure shown in FIG. 7 is applied.

As shown in FIG. 8, a direct mounting connector 100 includes a case 102 made of synthetic resin and a shield shell (not shown) for surrounding the case 102, wherein two sets of three housings 104 are arranged in a line situated at left and right over the case 102, and the case 102 has spaces (openings) 105 each for receiving a current sensor (see reference numeral 7 in FIG. 1), a block (see reference numeral 10 in FIG. 1) and so on.

Tab-shaped terminal parts 94-99 of the respective busbars 88-93 are situated in connector-fitting chambers of the respective housings 104, and horizontal terminal parts 82-87 protrude outside through the spaces 105 or a resin part 106 of the case 102. Each housing 104 and each of terminal parts 94-99 composes a small connector.

Figure 9:
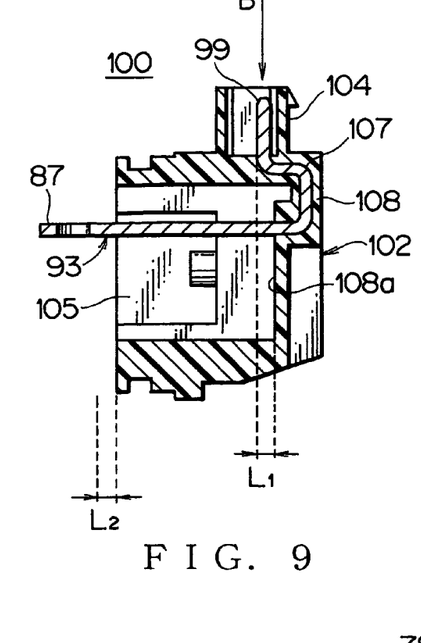
FIG. 9 is a cross sectional view taken along A-A line in FIG. 8.

As shown in FIG. 9, which is a cross sectional view taken along A-A line in FIG. 8, the busbar (for example, busbar 93) to be mounted in the space 105 for receiving the current sensor is bent being folded in a U-shape in section at a middle position thereof, the bent part 107 having the U-shape is fixed to an insulating resin part (wall part) 108 of the case made of synthetic resin by molding (i.e. insert molding) and continues to a perpendicular terminal part (for example, 99) within the housing 104 and a horizontal terminal part (for example, 87) in the space.

Since the bent part 107 of the busbar 93 is firmly fixed to the case 102 by molding, therefore as shown in an arrow B when a mating connector (not shown) is fit thereto from above the housing 104, the perpendicular tab-shaped terminal 99 is stably supported by the case 102 and securely electrically connected to a female terminal located in the mating connector, and a pressure force (i.e. sliding resistance with the female terminal) upon fitting of the mating connector is not transmitted to a horizontal terminal part 87 of the busbar 93, thereby preventing the horizontal terminal part 87 from being shifted in the up-and-down direction.

Further, since the horizontal terminal part 87 directly protrudes from an inner surface 108a of the perpendicular wall part 108 of the case 102, therefore a horizontal distance $L_1$ from the tab-shaped terminal part 99 to the perpendicular wall part 108 becomes long, that is, the depth of the space 105 becomes wide, therefore parts such as a current sensor enter into the depth of the case 102, so that a horizontal length of the case 102 is shortened by $L_2$ and the direct mounting connector 100 can be compact. Such an effect (i.e. the horizontal length of the case 102 being shortened) is also attained in the case 102 in which the current sensor is not arranged.

The effect of the molding of the bent part 107 of the busbar 93 to the case 102 is also attained in the busbar structure of the former preferred embodiments shown in FIGS. 2 and 6.

Figure 10:
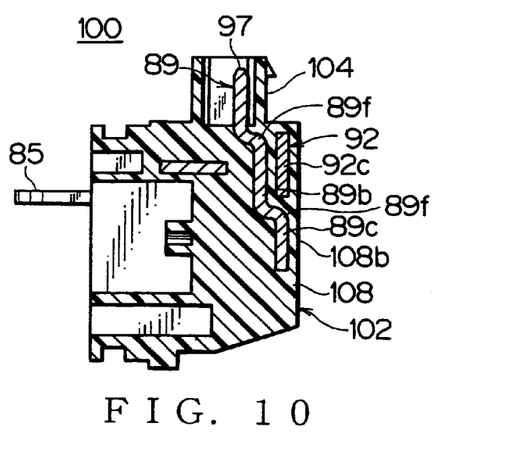
FIG. 10 is a cross sectional view taken along C-C line in FIG. 8.

As shown in FIG. 10, which is a cross sectional view taken along C-C line in FIG. 8, the busbar 89 insert-molded within the insulating resin part 108 of the case 102 is bent (89f) with two steps, its extended part 89c is arranged in the proximity of an outer surface 108b of the case 102 and located perpendicularly in parallel in the proximity of the outer surface 108b of the case 102 together with the extended part 92c of the other busbar 92. Therefore, similarly to the case shown in FIG. 9, the space for inserting parts such as the current sensor to the depth can be secured, so that the horizontal length of the case 102 can be shortened and the direct mounting connector 100 can be compact. Such an effect (i.e. the horizontal length of the case 102 being shortened) is also attained in the case 102 in which the current sensor is not arranged.

The invention claimed is:

1. A direct mounting connector to be directly mounted on an apparatus, comprising:
    six independent busbars for connecting the apparatus to two auxiliary machines of three-phase alternating current;
    two first terminal parts of U-pole, two first terminal parts of V-pole and two first terminal parts of W-pole of three-phase alternating current, altogether the six first terminal parts being formed at first ends of the respective busbars and being to connect with the apparatus, the two first terminal parts of the same pole being arranged adjacently to each other; and
    two sets, each set of which consists of a second terminal part of U-pole, a second terminal part of V-pole and a second terminal part of W-pole, altogether the six second terminal parts being formed at second ends of the respective busbars and being to connect with the auxiliary machines, the two sets being arranged adjacently to each other having a distance therebetween.

2. The direct mounting connector according to claim 1, wherein the busbars include extended parts extending between the two sets of the second terminal parts.

3. The direct mounting connector according to claim 2, wherein the first terminal parts connect with the corresponding second terminal parts through respective U-shaped bent parts.

4. The direct mounting connector according to claim 3, wherein the second terminal part of the busbar continues to the extended part through a step part and the extended part is flush with the other extended part of the other busbar.

5. The direct mounting connector as claimed in claim 3, wherein the busbars are molded in respective insulating resin parts.

6. The direct mounting connector according to claim 5, wherein the U-shaped bent parts are molded in the respective insulating resin parts.

7. The direct mounting connector according to claim 6, wherein current sensors are arranged inside the respective insulating resin parts, the first terminal parts penetrating through the respective current sensors.

* * * * *